Patented Oct. 11, 1949

2,484,529

UNITED STATES PATENT OFFICE 2,484,529

PROCESS FOR ALTERING THE PROPERTIES OF SOLID POLYMERS OF ETHYLENE

Milton J. Roedel, Wilmington, Del., assignor to E. I. du Pont de Nemours & Company, Wilmington, Del., a corporation of Delaware No Drawing. Application September 27, 1944, Serial No. 556,086

4 Claims. (Cl. 204—158)

1

This invention relates to polymeric materials and more particularly to methods for insolubilizing organic solvent soluble polymers.

It has been proposed previously to insolubilize certain polymers by incorporation of various cross-linking agents, such as peroxides. This method, however, is undesirable in many instances since the agents are expensive and are difficult to incorporate in polymers that are soluble or fusible only at relatively elevated temperatures.

This invention has as an object a simple and practical method for decreasing the thermoplasticity and solubility of polymeric materials. A further object is a method for this purpose applicable to the treatment of preformed polymers. A still further object is a method for treating polymers which, in addition to the above mentioned modification of properties, confers on the polymers other valuable characteristics. Other objects will appear hereinafter.

These objects are accomplished by intimately blending a polymer of the kind more particularly described below with a ketone and then exposing the blend to a concentrated artificial source of ultraviolet light until the mixture becomes insoluble in organic solvents in which the original polymer is soluble.

The present treatment is applicable to ultraviolet light transparent organic solvent soluble polymers which are essentially saturated. Examples of polymers of this kind useful in the practice of this invention are high molecular weight synthetic linear polyamides and polyesters, and polymers and copolymers of monomeric compounds of the formula

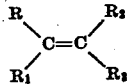

wherein R and R₁ are hydrogen or halogen, R₂ is hydrogen, halogen, or alkyl, and R₃ is hydrogen, halogen, alkoxy, acyl, acyloxy, carbamyl, acylamido or nitrile. Among this class of compounds the polymers obtained from vinyl esters of organic acids, and especially from the vinyl esters of saturated aliphatic carboxylic acids containing not more than 5 carbon atoms are particularly receptive to the insolubilization treatment described herein.

The invention is further illustrated by the following examples. Unless otherwise stated, the parts are by weight.

Example I

A solution of 12 parts of polyvinyl acetate in 88 parts of acetone is flowed onto a glass plate and allowed to dry at room temperature until most of the solvent is evaporated. The polyvinyl acetate film which still contains a substantial amount (5–25%) of retained acetone is then irradiated with a GE-Mazda Sunlight lamp (type S-4) for 15 hours at 25° C. at a distance of 6″. At the end of this time the polyvinyl acetate film is no longer soluble in acetone and its temperature of zero tenacity is increased from 100° C. to 250° C.

A polyvinyl acetate film prepared as described above, except that the acetone solvent is replaced with 95% ethyl alcohol is still soluble in acetone after being exposed to the same source of ultraviolet light for 15 hours. The treated film has a temperature of zero tenacity of 100° C.

Example II

One hundred parts of 3/1 ethylene-vinyl acetate interpolymer and 10 parts of acetophenone are blended on a rubber mill at 80° C. The blend is then exposed to ultraviolet light (a GE-Mazda Sunlight lamp type S-4) for 15 hours at 25° C. at a distance of 6″ from the source of light. At the end of this time the composition is no longer soluble in toluene at the refluxing temperature. Before exposure to ultraviolet light the composition is readily soluble in toluene in the cold.

Example III

Example II is repeated except that the acetophenone is replaced with an equal amount of benzoin. After exposing the composition to ultraviolet light for 15 hours at room temperature it is no longer soluble in boiling toluene. The untreated polymer is completely soluble in cold toluene.

Example IV

One hundred parts of N-methoxy methyl polyhexamethylene-adipamide is allowed to soak in 100 parts of a mixture of 70 parts of ethanol and 80 parts of water until the N-methoxy methyl polyhexamethyleneadipamide is thoroughly softened. The colloided material is then transferred to a rubber mill and blended with 10 parts of benzophenone. The composition is worked on the rolls until most of the solvent is evaporated. The composition is then placed in a press heated to 100° C. and pressed into a film (.001–0.1″ thick). The film thus made, which is completely soluble in 70/30 ethanol/water, is exposed to the light from a GE-Mazda Sunlight lamp (type S-4) for 15 hours at 25° C. at a distance of 6″. At the end of this time the film is insoluble in refluxing 70/30 ethanol/water.

Example V

One hundred parts of a polymer of ethylene having an intrinsic viscosity of 0.95 and 10 parts of benzophenone are blended on a rubber mill at 100°–120° C. The composition is then exposed to ultraviolet light from a GE-Mazda Sunlight lamp (type S-4) for 15 hours at 25° C. at a distance of 6″ from the source of light. The resulting composition is insoluble in refluxing toluene and has a temperature of zero tenacity of 300° C. The untreated polymer of ethylene is completely soluble in hot toluene and has a temperature of zero tenacity of 100°–110° C.

The synthetic linear polyamides used in the practice of this invention are of the general type described in United States Patents 2,071,250, 2,071,253 and 2,130,948 and are the synthetic linear condensation polyamides obtained by methods which comprise self-polymerization of a monoaminomonocarboxylic acid, and reaction in substantially equimolecular amounts of a dibasic carboxylic acid with either a diamine or a monoaminomonohydric alcohol. The preferred polyamides have an intrinsic viscosity of at least 0.4 and a unit length of at least 7 as this term is defined in above mentioned Patent 2,130,948. Examples of these polyamides suitable for the present purpose which are obtained from the above mentioned types of reactants or from their known equivalent amide-forming derivatives are polymerized aminocaproic acid, hexamethyleneadipamide or hexamethylenesebacamide and the polymerization product of ethanolamine with adipic or sebacic acid. These polyamides also include the polyesteramides obtained for example by including a glycol, such as ethylene glycol with the above mentioned reactants since the polyester-amides likewise contain in the polymer chain the recurring amide groups

where X is oxygen or sulfur and R is hydrogen or a monovalent hydrocarbon radical. On hydrolysis with hydrochloric acid the amino acid polymers yield the amino acid hydrochloride, the diamine-dibasic acid polymers yield the diamine hydrochloride, and the dibasic carboxylic acid, and the amino alcohol-dibasic acid polymers yield the amino alcohol hydrochloride and the dibasic carboxylic acid.

A further type of polyamide which is particularly useful in the practice of this invention are the N-alkoxymethyl polyamides. The polymer of this kind mentioned in Example IV is obtained by reacting at moderate temperature (25° to 75° C.) a formic acid solution of the polyamide with alcohol and formaldehyde, or by other methods described in application Serial No. 539,195, filed June 7, 1944, by Theodore L. Cairns, now Patent 2,430,860.

The polyesters used in the present process are the high molecular weight synthetic linear condensation polyesters which are described in above mentioned Patent 2,071,250 and which are obtained from bi-functional ester forming reactants for example by self esterification of hydroxy acids such as omega-hydroxydecanoic acid or by reaction of a dibasic acid, such as suberic acid, with a dihydric alcohol, such as trimethylene glycol under known reaction conditions which yield a high molecular weight polymer that can be drawn into continuous filaments which when cold drawn show, by characteristic X-ray patterns, orientation along the fiber axis.

The polymers of ethylene are polymers having a molecular weight of at least 6000 and comprise the polymers from ethylene obtained in accordance with United States Patent 2,153,553 and the unsymmetrical halogen substituted ethylene polymers described in United States Patent 2,160,903. Polymers of ethylene in which the ethylene constituent is polymerized in substantial or major proportion with other polymerizable materials can be used, for example with vinyl chloride, vinyl fluoride, vinyl butyl ether, vinylidene fluoride, vinyl acetate, vinylidene chloride, diethyl maleate, methyl acrylate, methyl methacrylate, diethyl itaconate, diethyl fumarate. chlorotrifluoroethylene, tetrafluoroethylene, maleic anhydride, etc.

The polymers useful in the practice of this invention obtained from compounds which correspond to the previously defined formula

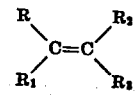

include polyisobutyl methacrylate, polymers of vinylidene chloride with acrylonitrile prepared as described in U. S. Patent 2,238,020, polymers of vinylidene chloride with vinyl esters, prepared as described in U. S. Patent 2,169,931, polymers of vinylidene chloride with styrene, prepared as described in U. S. Patent 2,169,932, polyvinyl acetate, polyvinyl chloride, polyvinyl fluoride, polymer of ethylene, polyvinyl ketones, such as poly-methyl vinyl ketone, polyacrylic esters, such as polymethyl acrylate, polyacrylamide, and polyacrylonitrile, poly(methyl methacrylate) polymethacrylonitrile, polymethacrylamide, etc.

In place of the specific ketones exemplified there can be used any ketone capable of dissociation into free radicals when excited with ultraviolet light. Specific examples include ethyl methyl ketone, diacetyl, methyl isopropyl ketone, diethyl ketone, diisopropyl ketone, mesityl oxide, phorone, ethylidene acetone, cyclopentanone, cyclohexanone, 3,3-dimethyl pentanone-2, methyl butyrone, 4-methyl octanone, isopropyl hexyl ketone, para-methyltolyl ketone, 2-methyl-1,4-xylyl ketone, caprone, para-tolyl acetone, isoamyl phenyl ketone, benzoyl cyclobutanone, alpha-isopropyl naphthyl ketone, dioctyl acetone, and the like.

Any artificial source of light which is rich in actinic rays such as a type H–4 100-watt mercury vapor lamp, etc., can be used in the practice of this invention. The source of ultraviolet light is desirably not less than half this strength in order to avoid exposure times that are inconveniently long. Sunlight is ineffective for the present purpose and a concentrated source of ultraviolet light must be used, namely, a source which can bring about insolubilization of the materials herein disclosed within 20 hours of continuous irradiation, at a distance of 6″ from the light source.

The length of exposure to the source of ultraviolet light may be varied from 1 minute up to 20 hours depending upon the type of polymer, source and intensity of ultraviolet light, and amount of catalyst used. As a rule insolubilization can be brought about in from 1 to 15 hours.

The amount of ketone used is at least 1% based on the weight of the polymer, generally it is from 2 to 50% and preferably from 5 to 10% by weight of the polymer.

The preferred method for adding the curing agent to the polymers used in the practice of this invention is illustrated by the examples. The compositions can also be obtained by dissolving the ingredients in a neutral, inert solvent, and then casting or extruding or by dispersing the ingredients in water or in an organic non-solvent and then combining and casting or extruding from the mixture.

In general, the process is operable at any temperature up to the decomposition temperature of the polymer. The process is usually operated at ordinary temperatures and can conveniently be carried out at temperatures as low as 10° C.

The present process provides a simple and inexpensive method for decreasing the thermoplasticity and solubility in organic solvents of polymers of the kind described hereinbefore, and enhances the utility of these polymers for many purposes. The normally soluble solid polymers of ethylene, for example, are converted to insoluble products which have considerably greater strength at elevated temperatures than the unmodified polymers. The process is highly useful in improving the heat-sealing properties of such polymers when used as wrapping foils.

The process is applicable to fibers, films, tapes, molded articles, extruded coatings or tubing, and the like.

To the compositions of this invention there can be added reinforcing agents, fillers, pigments, dyes and the like that do not impair the sensitivity of the composition to ultraviolet light.

The products of this invention are useful as cold setting adhesives, molded articles, in the coating of fabrics, as safety glass interlayers, as impregnants for paper, cloth and other bibulous materials, as unsupported films, fibers, tubes and the like, liners for food containers and bottle caps, etc.

As many apparently widely different embodiments of this invention may be made without departing from the spirit and scope thereof, it is to be understood that I do not limit myself to the specific embodiments thereof except as defined in the appended claims.

I claim:

1. A process for decreasing the thermoplasticity and solubility of ethylene polymers, said process comprising intimately blending a ketone, in amount of from 1% to 50% by weight, with a solid polymer of ethylene at a temperature of at least 10° C. and below the decomposition temperature of said polymer, exposing said blend of polymer and ketone to a concentrated source of ultraviolet light until the blend becomes insoluble in organic solvents in which said polymer is soluble before being subjected to said process.

2. The process set forth in claim 1 in which said ketone is benzophenone.

3. The process set forth in claim 1 in which said ketone is acetone.

4. The process set forth in claim 1 in which said ketone is benzoin.

MILTON J. ROEDEL.

REFERENCES CITED

The following references are of record in the file of this patent:

UNITED STATES PATENTS

| Number | Name | Date |
| --- | --- | --- |
| 2,297,351 | Gerhart | Sept. 29, 1942 |
| 2,300,495 | Gerhart | Nov. 3, 1942 |
| 2,367,660 | Agre | Jan. 23, 1945 |
| 2,374,078 | Coffman | Apr. 17, 1945 |
| 2,413,973 | Howk et al. | Jan. 7, 1947 |